United States Patent
Bogin et al.

[19]

[11] Patent Number: 6,157,397
[45] Date of Patent: Dec. 5, 2000

[54] AGP READ AND CPU WIRE COHERENCY

[75] Inventors: Zohar Bogin; Narendra S. Khandekar, both of Folsom; Vincent E. VonBokern, Rescue, all of Calif.

[73] Assignee: Intel Corporation, Santa Clara, Calif.

[21] Appl. No.: 09/050,381

[22] Filed: Mar. 30, 1998

[51] Int. Cl.[7] .................................................. G06F 13/00
[52] U.S. Cl. .................... 345/511; 345/521; 345/514; 345/520; 710/126; 710/129
[58] Field of Search ............................ 345/521, 507–509, 345/511, 512, 520, 514; 711/147, 151, 154, 158, 100; 710/126–129

[56] References Cited

U.S. PATENT DOCUMENTS

| | | | |
|---|---|---|---|
| 5,261,074 | 11/1993 | Solomon et al. ................... | 710/100 |
| 5,572,702 | 11/1996 | Sarangdhar et al. ............... | 711/146 |
| 5,761,450 | 6/1998 | Shah ..................................... | 710/107 |
| 5,860,112 | 1/1999 | Langendorf et al. ............... | 711/143 |
| 5,914,730 | 6/1999 | Santos et al. ....................... | 345/521 |
| 5,920,881 | 7/1999 | Porterfield .......................... | 711/2 |
| 5,923,860 | 7/1999 | Olarig ................................. | 710/129 |

Primary Examiner—Kee M. Tung
Attorney, Agent, or Firm—Blakely, Sokoloff, Taylor & Zafman LLP

[57] ABSTRACT

A method for graphics device read and processor write coherency receives a write request from a processor to write data to a storage element for a component to read and flushes the data to the storage element prior to the component reading the address associated with the data in the storage element.

12 Claims, 7 Drawing Sheets

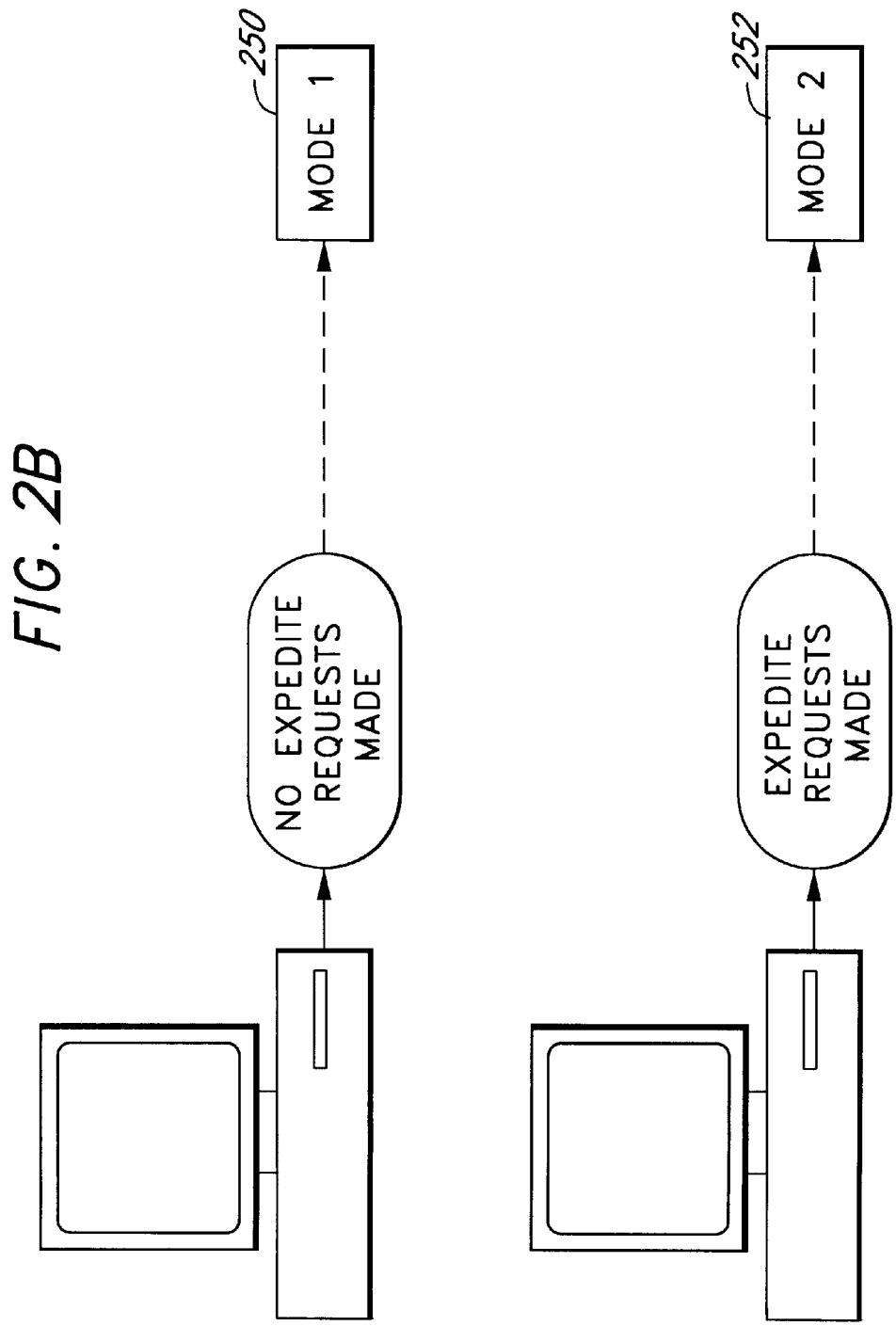

AGP READ AND CPU WIRE COHERENCY

BACKGROUND OF THE INVENTION (1) Field of the Invention

The present invention is in the field of memory access; more specifically, the present invention is related to a method and apparatus for accelerated graphics port (AGP) device read and central processing unit (CPU) write coherency.

(2) Related Art

Computer systems typically have a graphics device for processing graphics data for display on a display device. An accelerated graphics port (AGP) device (also referred herein as a graphics device) can request expedite priority in accessing a system memory over other devices including the processor. When a processor attempts to perform a write to the system memory for use by a graphics device, the graphics device responds by initiating a read to the system memory. The read is initiated while the processor write data remains in an intermediate buffer prior to being posted to the system memory. If the graphics device is able to read around the previously posted write data, a data coherency problem is created.

The prior art attempts to solve the data coherency problem by snoop stalling the processor initiated write to the graphics device. A snoop phase in general are used to maintain data coherency between the processor's internal cache and the system memory. Each cycle initiated by the processor has a snoop phase. Wait states may be inserted by a device in this phase (referred to as a snoop stall) if the device is not able to process the cycle immediately.

A disadvantage of the prior art is that the processor will not issue additional cycles until after the completion of the snoop phase. The prior art therefore leads to a performance penalty, since the processor bandwidth to the system memory is negatively affected.

It is therefore desirable to provide a method and an apparatus to ensure data coherency between graphics device reads and processor writes while minimizing the effect on the processor bandwidth to the system memory.

BRIEF SUMMARY OF THE INVENTION

A method for graphics device read and processor write coherency receives a write request from a processor to write data to a storage element for a component to read and flushes the data to the storage element prior to the component reading the address associated with the data in the storage element.

DETAILED DESCRIPTION OF THE INVENTION

The present invention is a method and apparatus for an accelerated graphics port (AGP) device read and central processing unit (CPU) write coherency.

Figure 1:
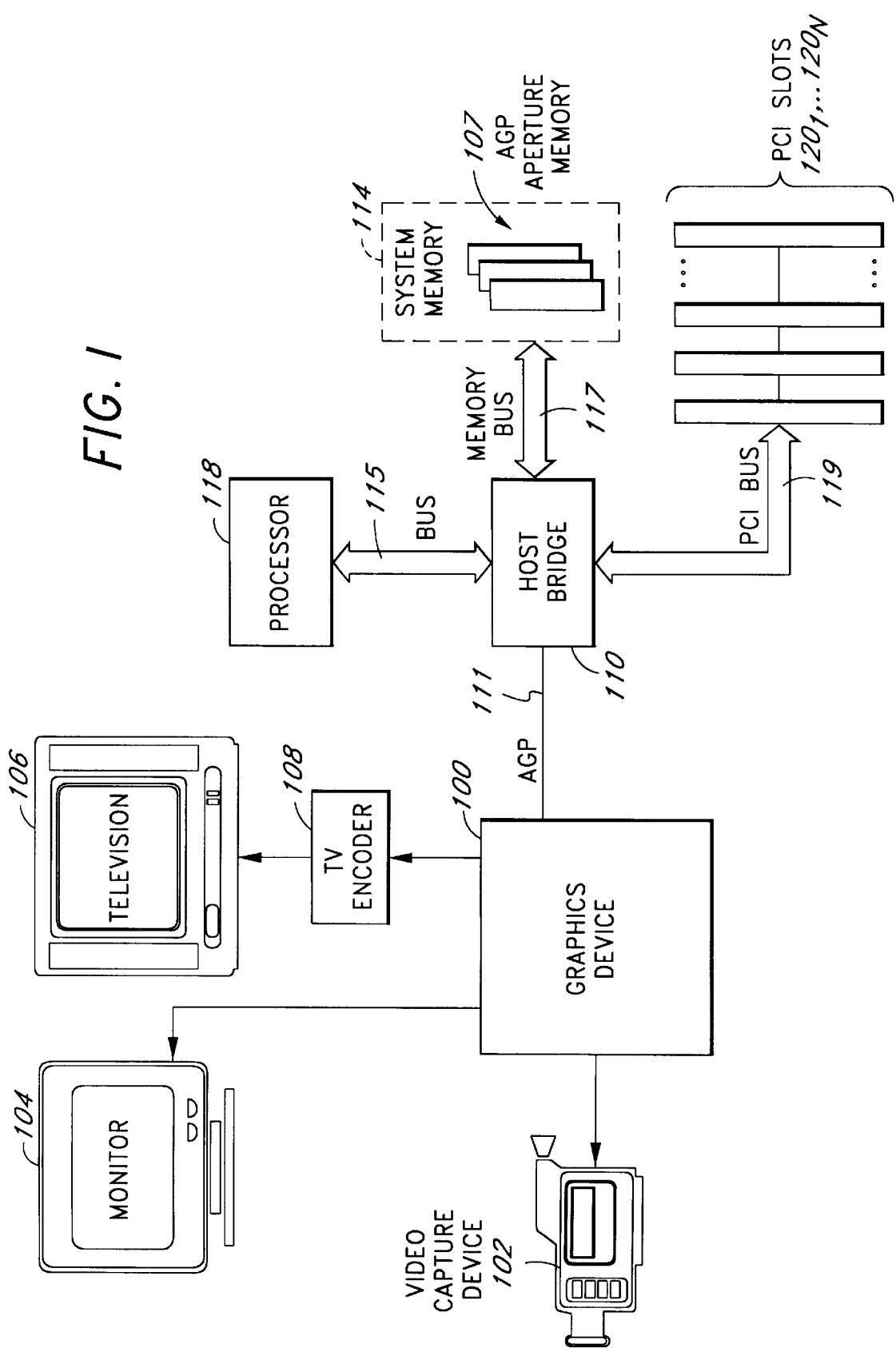
FIG. 1 illustrates an exemplary computer system having the present invention's mechanism for controlling AGP requests to the system memory.

FIG. 1 illustrates an exemplary computer system having the present invention's mechanism for controlling AGP requests to a system memory to maintain AGP read and CPU write coherency. An AGP device 100 (also referred herein as a graphics device) is capable of accepting video data from a video capture device 102 and processing the video data for display to a video display device such as a computer monitor 104 or a television monitor 106 through an encoder 108.

The graphics device 100 is coupled to a system memory 114 with an AGP aperture memory 107 through an AGP 111 and a host bridge 110. The AGP 111 is a port on the host bridge 110 which interfaces the host bridge 110 to the graphics device 100. The host bridge 110 is also coupled to a processor 118 through a bus 115 and PCI devices $120_1$ through $120_N$ through a bus 119 and provides access to the system memory 114 through a memory bus 117. In one embodiment, the processor as referred herein may be an Intel Pentium® II processor.

The PCI devices $120_1$ through $120_N$ are Input/Output (I/O) hardware devices coupled to the system through, for example, a PCI expansion connector (not shown) or mounted to the personal computer (PC) motherboard (not shown). Examples of PCI devices include, but are not limited to, a graphics controller/card, a disk controller/card, a local area network (LAN) controller/card and a video controller/card.

The AGP aperture memory 107 is a portion of the system memory 114 which is allocated by the operating system (not shown) for use by the graphics device 100. The graphics device 100 is provided with the reserved memory portion to store texture data, front buffer data or other graphics data for faster graphics data processing.

Figure 2A:
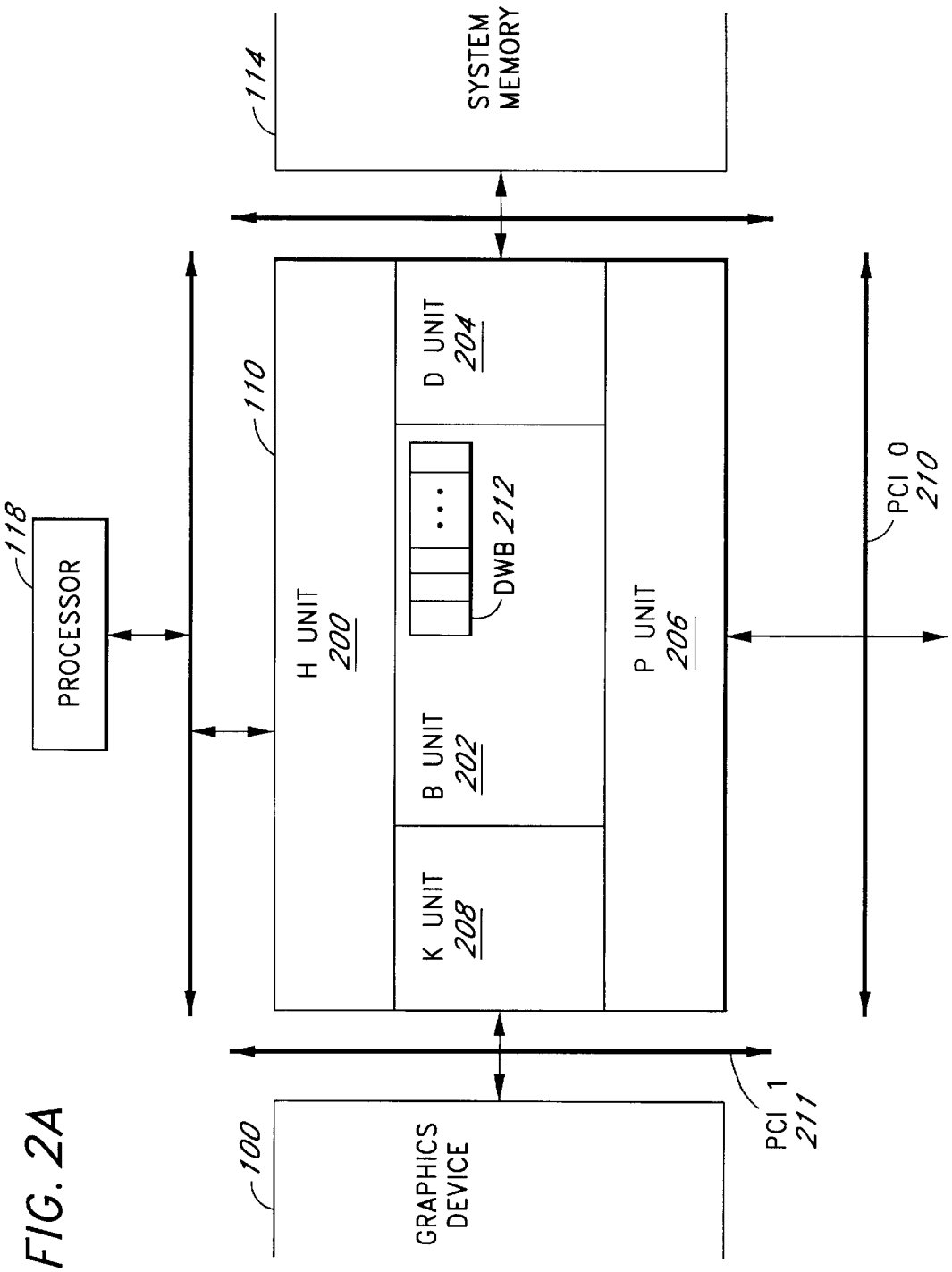
FIG. 2 illustrates an exemplary block diagram of the host bridge referred to in FIG. 1.

FIG. 2a illustrates an exemplary block diagram of the host bridge referred to in FIG. 1. The host bridge 110 has a host interface unit (H unit) 200 which interfaces the host bridge 110 with the processor 118. The host bridge 110 also has a bridge interface unit (B unit) 202 which controls the interaction between the various units including the processor 118, the graphics device 100, the PCI devices $120_1$ through $120_N$ and the system memory 114. A DRAM interface unit (D unit) 204 docks other devices to the system memory 114. A PCI interface unit (P unit) 206 docks at the primary PCI 0 (210). An AGP/PCI interface unit (K unit) 208 docks at AGP/PCI 1 (211) for the graphics device 100.

In one embodiment, the AGP 111 is a superset of the PCI bus, allowing transfers using PCI protocols or AGP semantics. Further, in one embodiment, PCI 0 is a standard PCI bus running at 33 MHz, while PCI 1 has standard PCI functionality and also supports AGP protocol and data transfer at 66/133 MHz.

In the present invention, the processor 118 initiates a write to the system memory 114. In order to speed up the write performance, internal buffers referred herein as data write buffers (DWB) 212 are provided in the B unit 202 such that the initial write by the processor 118 to update the data in the system memory 114 is performed first to the DWB 212's. For example, in one embodiment the DWB 212 may be 8 entries long to allow for the flushing of the entire DWB 212 within some predetermined desired time, in for example, 32–192 clock cycles.

Once the processor 118 performs the write to the DWB 212's, the processor 118 proceeds to perform a write to the graphics device 100 notifying the graphics device 100 that the data is available for the graphics device 100 to read. At this point, the graphics device 100 may initiate an AGP read access to the system memory 114. However, the DWB 212 has lower priority in performing a read/write access to the system memory 114 as compared to the graphics device 100 in performing an AGP read/write access to the system memory 114. Thus, an AGP read access to the system memory 114 for a particular data may be performed by the graphics device 100 prior to the data actually being written to the system memory 114 by the DWB 212. The AGP read access to the system memory 114 may therefore create data coherency problems. The present invention handles the data coherency issue in two different modes.

FIG. 2b illustrates the present invention having two modes of operation. Each mode is configured for a certain type of system. Namely, the first mode 250 is a preferred mode for a computer system having a graphics device which does not perform expedite accesses to the system memory 114. Examples of a lower priority access by the graphics device 100 to the system memory 114 include manipulation of data which does not require a guaranteed maximum latency for completion such as for accesses to surface data by a graphics engine.

The second mode 252 is configured to be implemented in a system with a graphics device 100 which performs expedite accesses to the system memory 114. Examples of graphics device access to the system memory 114 requiring expedite priority include updating of display such as for fetches of data from the system memory 114 that refresh a display device screen.

Figure 3:
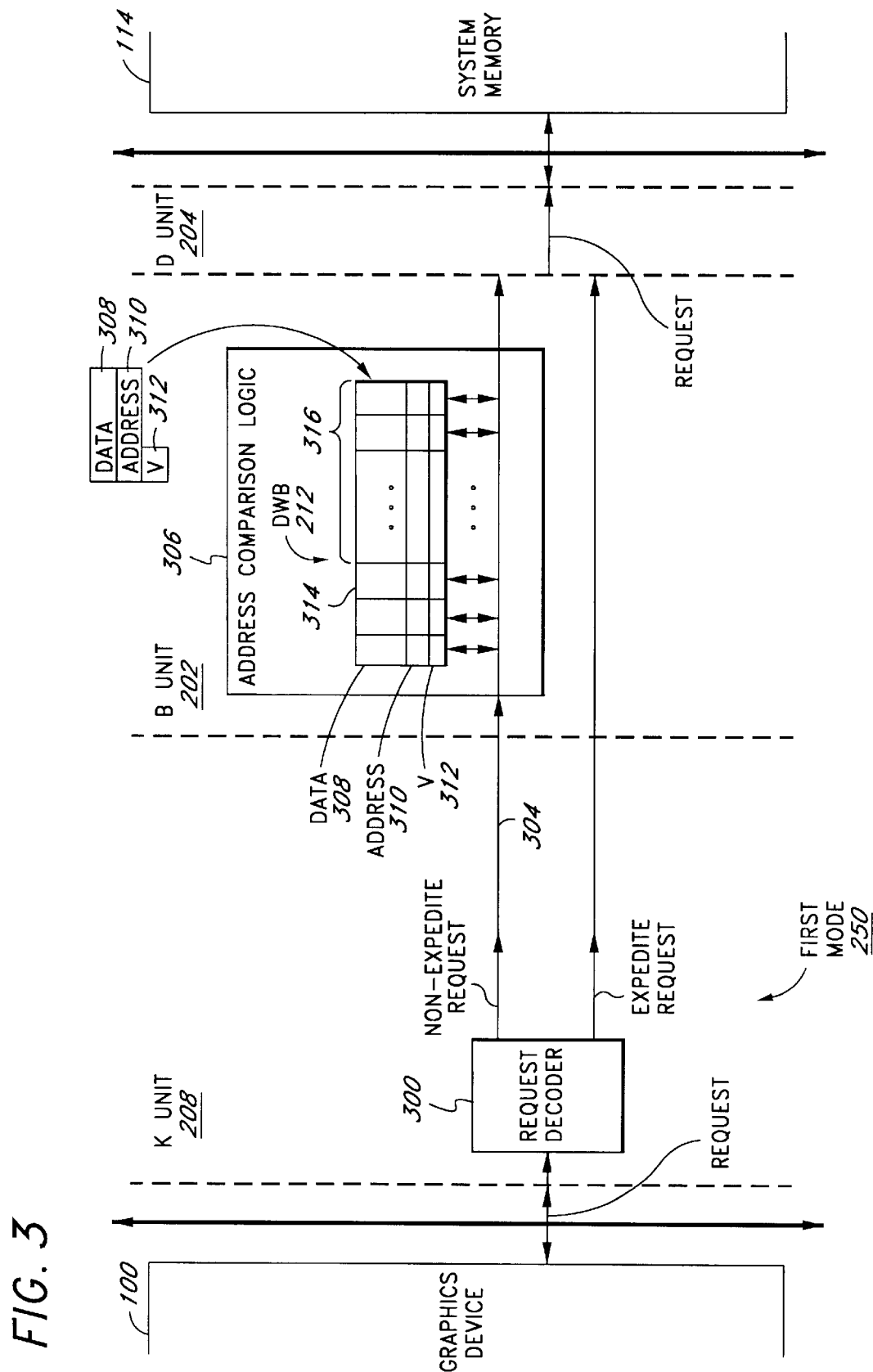
FIG. 3 is a block diagram illustrating one embodiment of the first mode of operation of the present invention.

FIG. 3 illustrates a block diagram of one embodiment of the first mode of the present invention. Once the processor 118 writes data to the DWB 212 and notifies the graphics device 100 that data is ready to be read from the system memory 114, the graphics device 100 generates an AGP read access to the system memory 114 through the host bridge 110.

The B unit 202 of the host bridge 100 compares the address associated with the given AGP read access to the system memory 114 with the addresses associated with the data posted to the DWB 212 by the processor 118. In the event that a non-expedite AGP request generated by the graphics device 100 has a matching address in the DWB 212, a DWB flush to write the data in the DWB 212 entries to the system memory 114 is initiated. The write continues until data in the DWB 212 entries with addresses matching the address associated with the non-expedite AGP request have been written to the system memory 114. At this point, the AGP read to the system memory 114 is allowed to proceed.

More specifically, the graphics device 100 makes a read request to the system memory 114 in response to a write cycle by the processor 118 to the graphics device 100 notifying the graphics device 100 that the processor 118 has performed a write to the system memory 114. The graphics device 100's request is decoded in a request decoder 300. Request bus 304 carries the non-expedite request which is passed on to an address comparison logic 306. The address to which the non-expedite request is destined is compared with each address entry in the DWB 212.

Each entry in the DWB 212 has data 308 posted by the processor 118 and destined to the system memory 114, an address 310 indicating where in the system memory 114 the data 308 is destined to and a valid bit 312 which indicates whether the entry has already been flushed to the system memory 114. The valid bit 312 is invalidated as soon as the corresponding data is flushed to the system memory 114.

The address comparison between the non-expedite request and each entry in the DWB 212 is performed in parallel and at the same time. If there is a DWB 212 entry having an address matching the address designated by the non-expedite request, then the corresponding data in the DWB 212 entry is flushed to the system memory 114. The flushing of the data from the DWB 212 is performed prior to the graphics device 100 actually retrieving data from the corresponding address in the system memory 114. If the corresponding data is at location 314 of the DWB 212 followed by other DWB 212 entries, then the data at location 314 of the DWB 212 as well as all the entries 316 ahead of location 314 are flushed to the system memory 114.

For example, in one embodiment, the DWB 212 is a FIFO with exemplary entry locations as follows: 7 (tail), 6, 5, 4, 3, 2, 1, 0 (head). If there is a hit to location 0, only location 0 is flushed. If there is a hit to location 1, then locations 1 and 0 are flushed. If there is a hit to location 2, then locations 2, 1 and 0 are flushed and so on. If the address of the non-expedite request matches the address of the data at location 7 in the FIFO, then the entire DWB 212 must be flushed to the system memory 114. This process can take up to 200 clocks. It is therefore not possible to guarantee a maximum latency of, for example, 140 clocks that is required for expedite cycles.

The first mode 250 guarantees that the processor 118 and PCI writes to the system memory 114 are being made visible to the graphics device 100 reads in a performance optimized manner for as long as expedite requests are not made.

Figure 4:
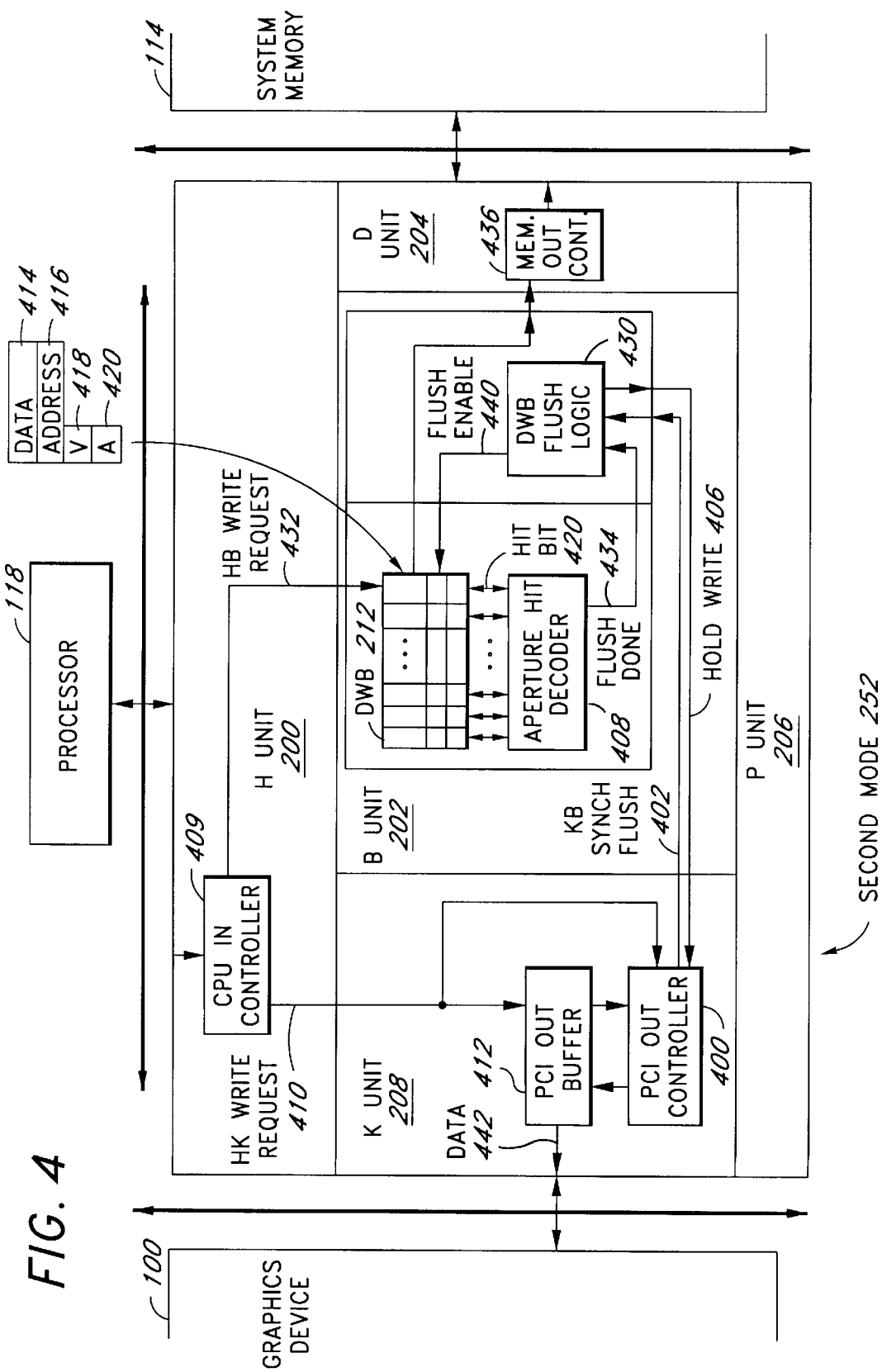
FIG. 4 is a block diagram illustrating one embodiment of the second mode of operation of the present invention.

FIG. 4 illustrates the second mode of operation of the present invention. In the first mode 250, if a computer system allows for expedite requests to be processed, the action of flushing the entire DWB 212 to satisfy the non-expedite request leads to significant expedite processing latency since the processing of pending expedite requests is stalled while the entire DWB 212 is flushed to the system memory 114. For example, given a DWB 212 with 8 entries, flushing the entire DWB 212 to the system memory 114 may cause the latency for the expedite read to exceed a typical desired latency of 140 clock cycles. The first mode therefore does not guarantee a minimum latency for processing of expedite requests, and thus is a preferred embodiment for systems that will not generate expedite requests.

The second mode 252 illustrated in FIG. 4 guarantees the required AGP read ordering in a non-optimized manner and guarantees expedite request latency. The second mode 252 is therefore configured to be used by graphics devices which use expedite cycles for time critical tasks such as screen refreshes.

When the processor 118 performs a data write to the system memory 114, the H unit asserts an HB write request 432 with the data to the B unit. The B unit 202 collects the data in the DWB 212. Each entry in the DWB 212 is configured to store data 414 posted by the processor 118 which is destined to the system memory 114, an address 416 in the system memory 114 where the data 414 is destined and a valid bit 418 which indicates whether the DWB 212 entry has been flushed to the system memory 114. When a given DWB 212 entry is flushed to the system memory 114 and no new updates have been made to the DWB 212 entry by the processor 118, the valid bit 312 of the DWB 212 entry is changed to invalid to avoid being flushed to the system memory 114.

Each DWB 212 entry also has an aperture hit bit 420. Each time a data is written to the DWB 212, an aperture hit decoder 408 determines whether or not the particular data is destined to an aperture memory 107 region in the system memory 114 by determining whether the address 416 of each DWB 212 entry is within an aperture memory 107 region. If a DWB 212 entry's address 416 is within an aperture memory 107 region, then the aperture hit decoder 408 generates an aperture hit bit 420 indicating that the data 414 is destined to the aperture memory 107 region and therefore is an aperture entry. The aperture hit bit 420 generated by the aperture hit decoder 408 is then loaded into the DWB 212.

Once the processor 118 performs a data write to the system memory 114 which is processed by the B unit as described above, the processor 118 performs a data write to the graphics device 100 by way of the H unit 200. The H unit 200's CPU in controller 409 informs the K unit 208 of the impending write by the processor 118 to the graphics device 100 by asserting an HK write request 410.

In response to the HK write request 410, the K unit stores the data write by the processor 118 to the graphics device 100 in a PCI out buffer 412. The HK write request 410 also causes a PCI out controller 400 of the K unit 208 to assert a KB synchronization flush signal 402 to the B unit 202. In response to the KB synchronization flush signal 402 from the K unit 208, a DWB flush logic 430 of the B unit 202 asserts a flush enable signal 440 and tags all the aperture entries in the DWB 212 requiring a flush. Tagging indicates which aperture entries had already been loaded into DWB 212 prior to the HK write request 410 is asserted.

The DWB flush logic 430 also asserts a hold write signal 406 until the data in all the aperture entries is flushed to the system memory 114. The aperture hit decoder 408 changes the valid bit 418 of each DWB 212 entry flushed to invalid indicating that the DWB 212 entry has been flushed. A memory out controller 436 of the D unit controls the forwarding of data to the system memory 114. If more CPU to AGP aperture cycles occur after the KB synchronization signal 402 is asserted, the additional CPU to AGP aperture cycles will not delay the processing of CPU to PCI 1 writes.

Once the DWB 212 is flushed, the aperture hit decoder 408 asserts a flush done signal 434 to the DWB flush logic 430. In response to the flush done signal 434, the DWB flush logic 430 of the B unit 202 de-asserts the hold write signal 406 to the K unit 208. The de-assertion of the hold write signal 206 causes the PCI out controller 400 of the K unit 208 to forward the data 442 posted to the PCI out buffer 412 by the HK write request 410 to the graphics device 100. The data 442 notifies the graphics device 100 that the data posted by the processor 118 is ready to be read from the system memory 114. In response to the HK write request 410, the graphics device 100 initiates a read cycle on the PCI 1 bus to read the data posted by the processor 118 to the system memory 114.

Figure 5:
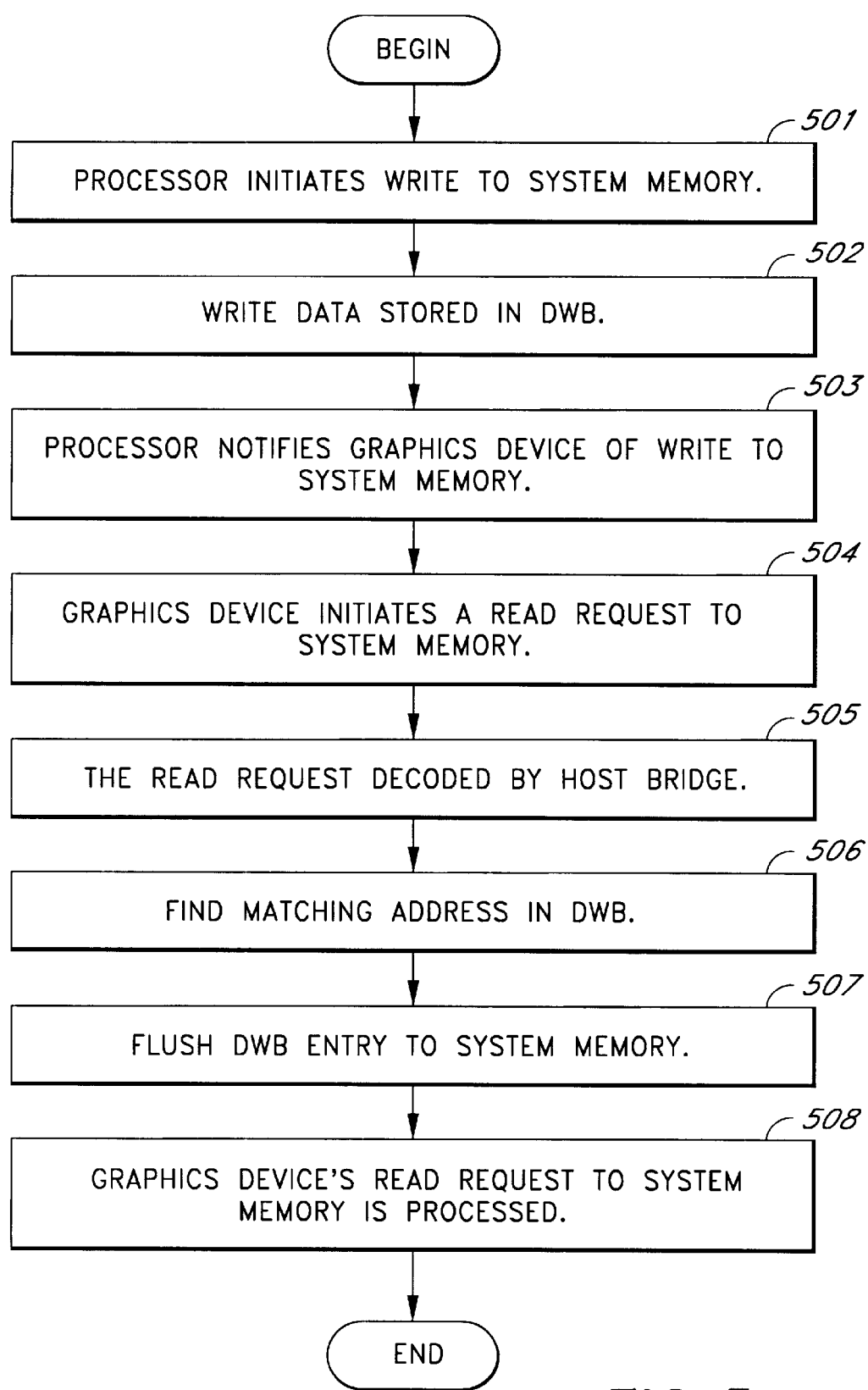
FIG. 5 is a flow diagram illustrating the general steps followed by one embodiment of the first mode of the present invention.

FIG. 5 is a flow diagram illustrating the general steps followed by the first mode of the present invention. In step 501, the processor 118 initiates a write cycle to the system memory 114. In step 502, the data and the address associated with the write cycle is stored in the DWB 212. In step 503, at or about the same time, the processor 118 initiates a write cycle to the graphics device 100 indicating that the processor 118 has posted a write to the system memory 114 for the graphics device 100 to read.

In step 504, in response to the write cycle in step 503, the graphics device 100 makes a read request to the system memory 114 through the host bridge 110. In step 505, the request is decoded in the request decoder 300.

In step 506, the non-expedite request is processed by the address comparison logic 306 which determines whether the non-expedite request address has a matching entry in the DWB 212. In step 507, if there is a matching DWB 212 entry, then the corresponding data is flushed to the system memory 114. In step 508, the non-expedite request is then forwarded to the D unit 204 for access to the system memory 114.

Figure 6:
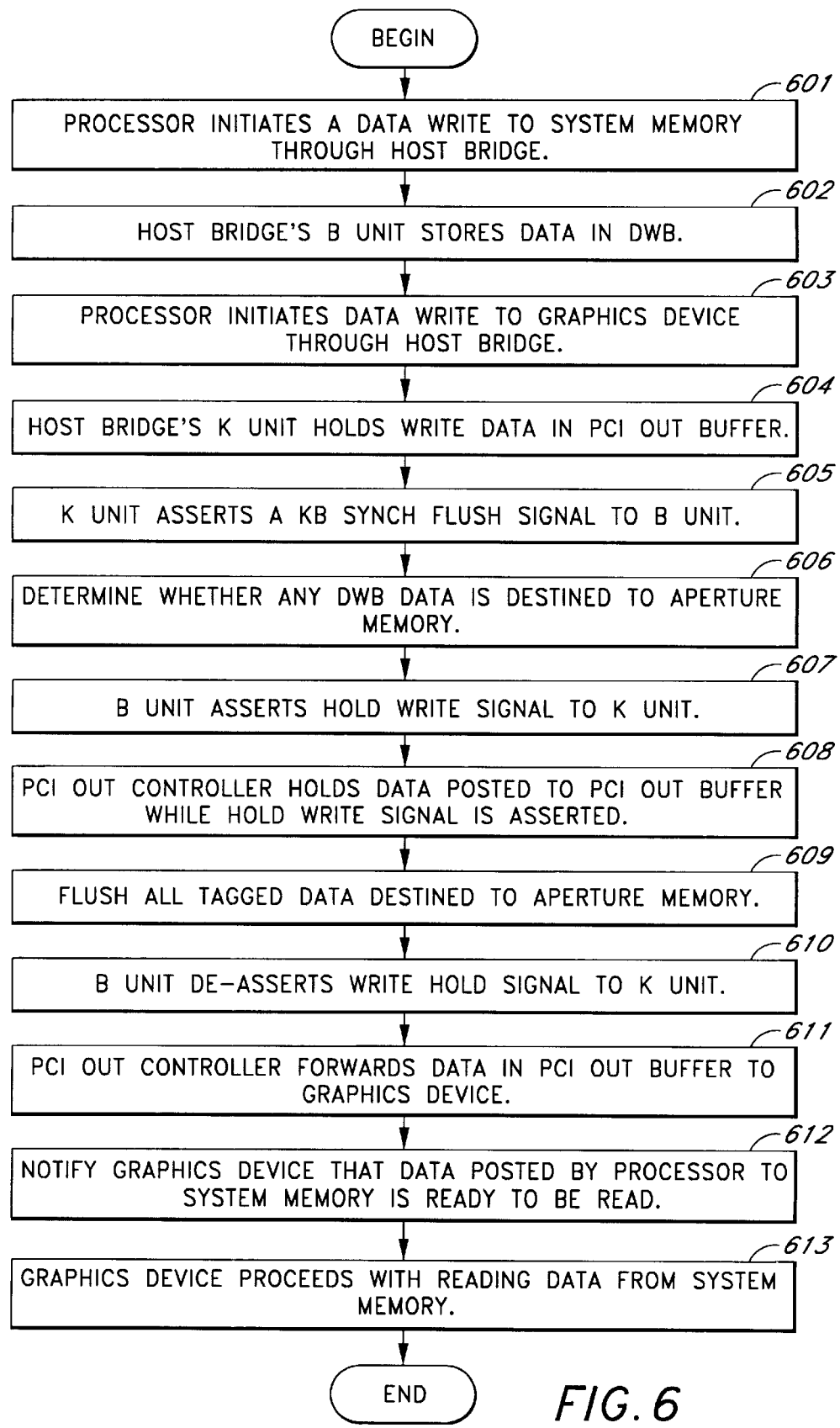
FIG. 6 is a flow diagram illustrating the general steps followed by one embodiment of the second mode of the present invention.

FIG. 6 is a flow diagram illustrating the general steps followed by the second mode of the present invention. In step 601, the processor 118 performs a write to the system memory 114. In step 602, the B unit 202 stores the data in the DWB and asserts an aperture hit 420 for each new DWB entry which is destined to the aperture memory 107 region of the system memory 114. In step 603, the processor 118 performs a write to the graphics device 100 by way of the K unit 208. In step 604, the H unit 200 and the K unit 208 hold the write data in the PCI out buffer 412.

In step 605, the HK write request 410 causes the K unit 208 to assert a KB synchronization flush signal 402 to the B unit 202. In step 606, in response to the KB synchronization flush signal 402, the B unit 202 checks to see if any of the data written into the DWB 212 is destined to the AGP aperture memory 107 region of the system memory 114. In one embodiment, the B unit 202 examines the aperture bit 420 of each DWB 212 entry to determine whether the DWB 212 has data destined to the aperture memory 107 region. In step 607, in response to the KB synchronization flush signal 402 from the K unit 208, the B unit 202 asserts a hold write signal 406 to the K unit 208. In step 608, the hold write signal 206 is forwarded to the PCI out controller 400 which holds the data posted to the PCI out buffer 412 by the HK write request 410 until the hold write signal 406 is de-asserted.

In step 609, if there is data meant for the AGP aperture memory 107 region of the system memory 114, the DWB 212 flushes those entries to the system memory 114. In step 610, once the DWB 212 is flushed to the system memory 114, the B unit 202 de-asserts the hold write signal 406 to the K unit 208. In step 611, the de-assertion of the hold write signal 206 causes the PCI out controller 400 to forward the data posted to the PCI out buffer 412 by the HK write request 410 to the graphics device 100. In step 612, the host bridge 110 initiated write on the AGP 111 notifies the graphics device 100 that the data posted by the processor 118 is ready to be read from the system memory 114. In step 613, the graphics device 100 proceeds to read the data from the system memory 114.

What has been described is a method and apparatus for AGP read and CPU write coherency. The present invention provides coherency in a performance optimized manner. The first mode of operation of the present invention provides AGP read ordering with optimized performance. The second mode provides coherency while guaranteeing expedite latency.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for graphics device read and processor write coherency comprising:

receiving aperture entry data in a data write buffer from a central processing unit, the aperture entry data being data directed to an aperture region of a system memory;

receiving a data write to a graphics device from the central processing unit;

transmitting the aperture entry data received prior to receiving the data write to the graphics device, the aperture entry data being transmitted from the data write buffer to the system memory; and then transmitting the data write to the graphics device.

2. The method of claim 1 wherein the data write buffer further comprises an aperture flag that is asserted when the aperture entry data is received from the central processing unit and cleared when the aperture entry data is transmitted to the system memory.

3. The method of claim 1 further comprising tagging the aperture entry data in the data write buffer when the data write to the graphics device is received.

4. The method of claim 3 wherein transmitting the aperture entry data from the data write buffer to the system memory further comprises transmitting all tagged data.

5. A host bridge apparatus comprising:

a data write buffer that receives aperture entry data from a central processing unit, the aperture entry data being data directed to an aperture region of a system memory;

a controller that receives a data write to a graphics device from the central processing unit;

a bridge interface unit that transmits the aperture entry data from the data write buffer to the system memory, and then transmits the data write to the graphics device.

6. The host bridge apparatus of claim 5 further comprising an aperture hit decoder that asserts an aperture flag in the data write buffer when the aperture entry data received from the central processing unit and clears the aperture flag when the aperture entry data is transmitted to the system memory.

7. The host bridge apparatus of claim 5 further comprising flush logic that tags the aperture entry data in the data write buffer when the data available notification is received.

8. The host bridge apparatus of claim 7 wherein the bridge interface unit transmits the aperture entry data from the data write buffer to the system memory if the data further is tagged.

9. A system comprising:

a central processing unit;

a system memory;

a graphic device; and a host bridge coupled to the central processing unit, the system memory, and the graphic device, the host bridge including a data write buffer that receives data from the central processing unit;

a controller that receives a data available notification from the central processing unit;

a bridge interface unit that transmits the data from the data write buffer to the system memory if the data is in an aperture region of the system memory, and then transmits the data available notification to the graphics device.

10. The system of claim 9 wherein the bridge interface unit further comprises an aperture hit decoder that asserts an aperture flag in the data write buffer when the data received from the central processing unit is in the aperture region and clears the aperture flag when the data is transmitted to the system memory.

11. The system of claim 9 wherein the bridge interface unit further comprises flush logic that tags the data in the data write buffer that is in the aperture region when the data available notification is received.

12. The system of claim 11 wherein the bridge interface unit transmits the data from the data write buffer to a system memory if the data further is tagged.

* * * * *